United States Patent [19]

Henning et al.

[11] 4,354,969
[45] Oct. 19, 1982

[54] DYE MIXTURES

[75] Inventors: Georg Henning; Bertold Honigmann, both of Ludwigshafen; Gunther Lamm, Hassloch, all of Fed. Rep. of Germany

[73] Assignee: BASF Aktiengesellschaft, Ludwigshafen, Fed. Rep. of Germany

[21] Appl. No.: 163,946

[22] Filed: Jun. 30, 1980

[30] Foreign Application Priority Data

Jul. 23, 1979 [DE] Fed. Rep. of Germany ....... 2929848

[51] Int. Cl.³ .................... C07C 107/00; C09B 29/36
[52] U.S. Cl. ........................................ 260/156; 8/639
[58] Field of Search ............................ 260/156; 8/639

[56] References Cited

U.S. PATENT DOCUMENTS

Re. 29,640  5/1978  Lamm et al. ............ 260/156 X
3,998,802  12/1976  Dehnert et al. ............ 260/156
4,042,578  8/1977  Dehnert et al. ............ 260/156

FOREIGN PATENT DOCUMENTS 2062717  6/1972  Fed. Rep. of Germany ...... 260/156
2525505  12/1976  Fed. Rep. of Germany ...... 260/156

Primary Examiner—Charles F. Warren
Attorney, Agent, or Firm—Oblon, Fisher, Spivak, McClelland & Maier

[57] ABSTRACT

Dye mixtures which contain dyes of the formula I

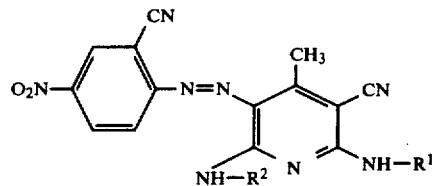

where $R^1$ and $R^2$ have the following meanings:

| Dye | $R^1$ | $R^2$ |
|---|---|---|
| 1 | $C_2H_4OH$ | $(CH_2)_3OC_2H_4OC_6H_5$ |
| 2 | $(CH_2)_3OC_2H_4OC_6H_5$ | $C_2H_4OH$ |
| 3 | $(CH_2)_3O(CH_2)_4OH$ | H |
| 4 | H | $(CH_2)_3O(CH_2)_4OH$ |

3 Claims, No Drawings

DYE MIXTURES

The present invention relates to dye mixtures which contain dyes of the formula I

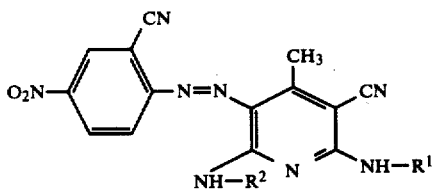

where $R^1$ and $R^2$ have the following meanings:

| Dye | $R^1$ | $R^2$ |
|---|---|---|
| 1 | $C_2H_4OH$ | $(CH_2)_3OC_2H_4OC_6H_5$ |
| 2 | $(CH_2)_3OC_2H_4OC_6H_5$ | $C_2H_4OH$ |
| 3 | $(CH_2)_3O(CH_2)_4OH$ | H |
| 4 | H | $(CH_2)_3O(CH_2)_4OH$. |

The ratio of isomer 1 to isomer 2, and of isomer 3 to isomer 4, is in each case about 70:30, and isomers 1 and 2 together account for from about 65 to 90%, preferably from 70 to 80%, of the mixture.

The individual dyes may be prepared by methods similar to those described in German Pat. No. 2,062,717; the isomer ratio of about 70:30 results from the method of synthesis.

Mixtures according to the invention, which contain mixed crystals, are obtained from the components by heating, advantageously in water, at from about 80° to 100° C., preferably at about 90° C. It is particularly advantageous to prepare the mixture of the components by diazotizing 2-amino-5-nitrobenzonitrile and coupling with the appropriate 2,6-diamino-pyridine derivatives, and then to heat the resulting mixture directly.

The mixtures according to the invention are exceptionally suitable for dyeing polyesters. Compared to the β-modification of dye 1, described in German Laid-Open application DOS No. 2,525,505, the novel mixtures show a further improvement in tinctorial characteristics, in particular an increased tinctorial strength, and are simpler to prepare, since a treatment under superatmospheric pressure, ie. in an autoclave, is not necessary.

In the Examples which follow, parts and percentages are by weight, unless stated otherwise.

EXAMPLE 1

22.8 parts of 2-amino-5-nitrobenzonitrile are diazotized in sulfuric acid by means of nitrosylsulfuric acid in a conventional manner, and the product is precipitated by pouring it onto a mixture of 240 parts of water and 300 parts of ice. A solution of 7.8 parts of a mixture of 2-(ω-hydroxybutoxypropylamino)-3-cyano-4-methyl-6-aminopyridine and its isomer in which the substituents in the 2- and 6-positions are interchanged, in hydrochloric acid is then added. Thereafter, a solution of 40.3 parts of a mixture of 2-(ω-phenoxyethoxypropylamino)-3-cyano-4-methyl-6-(hydroxyethylamino)-pyridine and its isomer in which the substituents in the 2- and 6-positions are interchanged, in dimethylformamide, is run in. The batch thus obtained is then brought to pH 2.4 with sodium hydroxide solution, whilst keeping the temperature below 10° C. by means of ice. When coupling is complete, the batch is heated to 90°–95° C. and stirred for a further 2 hours at the same temperature. It is then filtered and the product is washed with hot water. After drying, 68 parts of the dye are obtained in its tinctorially valuable mixed crystal modification.

EXAMPLE 2

80 parts of a dye mixture obtained by coupling 2-amino-5-nitrobenzonitrile with 2-(or 6-) (ω-phenoxyethoxypropylamino)-3-cyano-4-methyl-6-(or 2-) hydroxyethylaminopyridine and 20 parts of the dye mixture obtained by coupling 2-amino-5-nitrobenzonitrile with 2-(or 6-) (ω-hydroxybutoxypropylamino)-3-cyano-4-methyl-6-(or 2-)aminopyridine are introduced into 2,000 parts of water and the mixture is heated for 2 hours at 95° C. It is then filtered and the product is dried. 100 parts of the dye are obtained in its tinctorially valuable mixed crystal modification.

We claim:

1. A dye mixture which contains dyes of the formula I

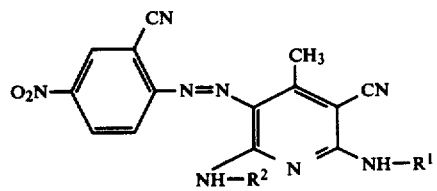

where $R^1$ and $R^2$ have the following meanings:

| Dye | $R^1$ | $R^2$ |
|---|---|---|
| 1 | $C_2H_4OH$ | $(CH_2)_3OC_2H_4OC_6H_5$ |
| 2 | $(CH_2)_3OC_2H_4OC_6H_5$ | $C_2H_4OH$ |
| 3 | $(CH_2)_3O(CH_2)_4OH$ | H |
| 4 | H | $(CH_2)_3O(CH_2)_4OH$. |

2. A mixture as claimed in claim 1, which contains from 65 to 90% of dyes 1 and 2.

3. A mixture as claimed in claim 1 or 2, which contains from 70 to 80% of dyes 1 and 2.

* * * * *